United States Patent [19]

Sasamoto et al.

[11] Patent Number: 4,816,278

[45] Date of Patent: Mar. 28, 1989

[54] PROCESS FOR PROCESSING AND TREATING RAW MATERIALS OF MARINE PRODUCTS

[75] Inventors: Yasuhiko Sasamoto; Youichi Kammuri, both of Tokyo; Kiyohiko Sawa; Masami Araki, both of Kobe; Shizuya Morimoto, Tokyo; Fumio Mitsui, Tokorozawa; Nobuyoshi Miyazaki, Kawasaki, all of Japan

[73] Assignees: The Japanese Research and Development Association for Extrusion Cooking; Nippon Suisan Kabushiki Kaisha; Taiyo Fishery Co., Ltd., all of Tokyo; Kabushiki Kaisha Kobe Seikosho, Hyogo; Ajikan Co., Ltd., Hiroshima; Kowa Kougyo Co., Ltd., Osaka, all of Japan

[21] Appl. No.: 823,634

[22] Filed: Jan. 29, 1986

[30] Foreign Application Priority Data

| Jan. 30, 1985 [JP] | Japan | 60-14429 |
| Feb. 20, 1985 [JP] | Japan | 60-30469 |
| Mar. 25, 1985 [JP] | Japan | 60-60158 |
| Apr. 5, 1985 [JP] | Japan | 60-71940 |

[51] Int. Cl.$^4$ .................. A22C 25/00; A23L 1/325
[52] U.S. Cl. .................. 426/513; 426/516; 426/643
[58] Field of Search ............ 426/448, 516, 643, 513, 426/656; 425/204

[56] References Cited

U.S. PATENT DOCUMENTS

| 3,886,299 | 5/1975 | Feldbrugge et al. | 426/656 |
| 4,113,822 | 9/1978 | Takiura et al. | 425/204 |
| 4,364,664 | 12/1982 | Theysohn | 425/204 |
| 4,540,592 | 9/1985 | Myer et al. | 426/516 |
| 4,579,741 | 4/1986 | Hanson et al. | 426/516 |
| 4,590,081 | 5/1986 | Sawada et al. | 426/448 |

OTHER PUBLICATIONS

The First International Symposium on Twin-Screw Extruder for Food Industry, Oct. 2 and 3, 1984, pp. I-1, I-2, I-9, III-1.

Primary Examiner—George Yeung
Attorney, Agent, or Firm—Wenderoth, Lind & Ponack

[57] ABSTRACT

A process for processing and treating raw materials such as marine products comprising of fishes, shellfishes, such as Crustacea and mollusks, and seaweeds or mixtures of said material and an optional mixing additive such as soyprotein, wheat flour and starch by means of a twin-screw extruder. The extrudates obtained by the process have qualities and mouthfeel characteristics different from those of the raw material.

6 Claims, No Drawings

PROCESS FOR PROCESSING AND TREATING RAW MATERIALS OF MARINE PRODUCTS

BACKGROUND OF THE INVENTION

This invention relates to a novel process for processing and treating raw materials of marine products, and, more particularly, to a process for producing new food products having different quality and mouthfeel by treating raw materials of marine products such as fishes and shellfishes and seaweeds by means of a twin-screw extruder to texturize the same.

Fishes and shellfishes and seaweeds have been long eaten widely in Japan, and have been valuable sources of nutrition. However, in recent years, life style in Japan has become westernized and varied. The odor of fishes and shellfishes per se, the presence of bones and the troublesome removal of them while eating are disliked. Particularly, the younger generation eats less fishes and shellfishes. At the same time, the younger generation eats less seaweeds. In contrast, the consumption of meat has been increasing. On the other hand, fishes and shellfishes have not been so much consumed in Europe and America. However in recent years, they have been revaluated as low-calorie and high-protein food products, and are being eaten in gradually increasing amounts. If the products can be rendered into a more readily eatable form, it will be possible to make them more attractive to many people.

In order to prevent the trend toward fish-avoidance or to encourage more people to eat marine products, attempts have been made to render the fishes and shellfishes and seaweeds to a more readily eatable condition. For example, there have been developed a method for producing a food product having a meat-like fibrous texture by slowly freezing the fine flesh of fishes and shellfishes; and a process for producing a crab meat-like fibrous food product by molding and heating surimi paste in the noodlelike form from a nozzle or slit, or by extruding it in a coagulating solution to chemically modify the same. "Surimi" herein is a Japan term for mechanically deboned fish meat that has been washed with water and mixed with cryoprotectants for a good frozen shelflife. Thus, there have been provided a variety of food products which make possible enjoyable ingesting of fish meat protein differing in taste, flavor and mouthfeel from those of fish meat protein. Particularly, recently, crab meat-like food products are widely and favorably used.

While there have been provided meat-like or crab meat-like food products having different quality and mouthfeel from those of the fish and shellfish meat, the quality and mouthfeel in meat-like food products are not always satisfactory. Moreover, when surimi is used as a raw material, a water-soluble protein cannot be utilized because surimi is mechanically deboned fish meat that has been washed with water. Further, in producing such food products, apparatuses having respective functions are necessary in kneading, molding, heating and other steps, and therefore high cost and labor are necessary in the purchase, operation, and maintenance of such apparatuses. Furthermore, the development of food products capable of making the ingesting of seaweeds placement has not yet been sufficient.

Various studies have been carried out in order to provide a process for producing a new food product wherein raw materials for marine products such as fishes, shellfishes and seaweeds are treated by a simplified apparatus or process to provide food products which have different quality and mouthfeel from those of these materials, which retain water-soluble proteins and salt-soluble proteins, and which can be enjoyably eaten. We have now found that, when the raw materials of marine products such as surimi and chopped fish flesh which is mechanically separated with a deboner are treated by means of a twin-screw extruder, they can be easily textured by one apparatus and a delicious food product having new flavor and mouthfeel characteristics can be produced.

SUMMARY OF THE INVENTION

Accordingly, the present invention provides a method for processing and treating a raw material of marine product which comprises the step of treating said raw material by means of a twin-screw extruder, said raw material comprising one or more raw materials of marine products selected from the group consisting of fishes and shellfishes and seaweeds, or a mixture of the raw material and a mixing additive.

DETAILED DESCRIPTION OF THE INVENTION

The present invention will be described in detail hereinafter.

One or more materials selected from fishes shellfishes, e.g. Crustacea and mollusks, and seaweeds are used as raw materials of marine products in the present invention. Chopped fish meat obtained by removing inedible portions such as the head, the guts (internal organs), and backbone from various fishes such as mackerel, sardine, cod, Alaska pollack, lefteye flounder, tuna, bonito and horse mackerel and collecting fish flesh by means of a fish deboner, are preferably used as the fish meat. In addition, surimi, that is minced meat obtained by washing chopped fish meat with water, and so-called marine beef-like fish flesh obtained by removing lipids and water from fish flesh to finish into a granular dried product, can be also used in the present invention. Commercially available frozen surimi obtained by freezing on board; those obtained by thawing it; those obtained by grinding only it; or those obtained by mincing it with salt can be used as the raw material.

Prior art fish protein concentrates (FPC) are white powders obtained by boiling down fishes in a solvent to remove the taste and odor of the fishes. They lack hydrophilic property. Their mouthfeel is inferior because they are powders. Thus, it is difficult to utilize them as food materials. A developed food material which is superior to FPC, which is compatible with water and which provides meat-like mouthfeel is marine beef.

A process for producing marine beef comprises raw fish deboning, preparation and kneading, chopping, alcohol immersion and drying steps. The marine beef products are powders having a moisture content of about 8% or below.

When this marine beef is used in combination with fishes and shellfishes, it absorbs the moisture of the fishes and shellfishes and thus the moisture content of the surimi paste is suitably adjusted. Not only is the texturization of the fishes and shellfishes smoothly carried out, but the fishes and shellfishes are also highly compatible with the marine beef to form a textured protein having extremely good flavor.

Examples of the shellfish flesh for use in this invention include short-necked clam, corbicula, clam, scallop and oyster. Examples of the Crustacea flesh for use herein include crab, shrimp, and krill. Examples of the mollusk flesh for use herein include squid and octopus. Examples of the seaweeds for use herein include Undaria pinnatifida, kelp, and laver.

These raw material of marine products may be used alone or in combination. The combinations and ratios are optionally selected depending upon their purposes. While the materials may be previously ground, chopped and premixed, they can be mixed and kneaded in a twin-screw extruder apparatus. Each raw material having a high moisture content of from about 10% to about 80% is ordinarily used as it is without drying to remove the moisture.

While the materials may be the raw materials of marine products alone in the present invention, a mixing additive can be added as needed.

A mixing additive mentioned above means a material added optionally to the raw material for the moisture adjustment, hardness adjustment or binding of the raw material, thereby to provide suitable mouthfeel, flavour, hardness and color to the products.

Examples of the mixing additive described above includes soybean origin and/or wheat origin vegetable proteins such as whole soybean, defatted soybean or its flour, soybean protein flour, wheat gluten and beancurd refuse; seed such as adzuki bean and peanut; yeast; starch such as potato starch and corn starch; cereal flour such as wheat flour and rice flour; milk, dry milk powder, casein, chopped meat, egg albumen, vegetables and fruits.

These mixing additives may be added alone or in combination. While the mixing additive can be used in a quantity in a range of from 0.5% to 300% based on the weight of the surimi, the preferred amount thereof is from about 1% to about 100%.

As described above, use of these mixing additives is optional. Their kind and blend ratios are also optional. When they are used, they play roles of the moisture adjustment, hardness adjustment or binding agent for the marine materials having a high moisture content, and provide suitable mouthfeel, flavor, hardness and color to the products. It is possible to provide a variety of meat-like or preferred mouthfeel textured products by selecting the kinds, blend ratios and combination of the additives. Thus, the use of such additives is desirable.

In addition, powdered or liquid additives such as seasonings, spices, expanders, thickeners and colorants can be optionally used in the presence or absence of such mixing additives.

The mixing of these additives and the raw materials of marine products may be previously carried out, or can be carried out in the twin-screw extruder apparatus.

In the present invention, such raw materials of marine products, or mixtures of the raw materials and the mixing additives are treated by means of a twin-screw extruder. The extruder is an apparatus having functions of simultaneously carrying out temperature treatment and mechanical treatment. Specifically, the extruder has the ability to carry out for a short period of time steps such as transportation, compression, mixing, kneading, shearing, heating, pasteurization, swelling and molding according to the desired effects on the processed material. The extruder is useful in the production of various food products.

The extruder comprises five elements: a feeder, a barrel, a screw, a die, and a heater (or a cooling portion). Factors which determine its characteristics are the number of axes and shape of the screw(s) and the mutual positional relationship (in the case of a plurality of screws).

Extruders include a single screw extruder having one screw and a twin-screw extruder having two screws. While in the case of a single screw extruder the material transportation occurs due to only the friction between the barrel and the materials, in the case of twin-screw extruder, there are also the extrusion action and slipping action of the screws which rotate by biting with each other. Accordingly, while the productivity of the single screw extruder is dependent upon the moisture and oil content of the raw materials, the pressure and the like, the productivity of the twin-screw extruder is independent of such factors as moisture in certain ranges, and the twin-screw extruder makes it possible to carry out stable operations. Accordingly, even in the case of the raw materials having a high moisture and a high oil content such as raw materials of marine products, they can be suitably treated if a twin-screw extruder is used. Thus, the twin-screw extruder is used in the present invention.

Examples of the twin-screw extruders include those manufactured by Suehiro Iron Works Co., Ltd. and Kowa Kougyo Co., Ltd., Kobe Steel Ltd., in Japan, and those manufactured by Crextral, France. In each apparatus manufactured by each company, twin screws fully bite in the same rotational direction, and the material transportation in the barrel is carried out positively without any obstruction.

According to the present invention, when the material to be treated, i.e., the raw materials of marine products or the mixtures of said raw materials and the mixing additives are fed from a feeder to a twn-screw extruder, treatments such as kneading, heating and molding are continuously carried out in one apparatus and thus a textured final product is obtained. The feed speed of the raw material of marine product or the mixture of the raw material and the mixing additive to the extruder may be generally from 50 to 3,000 grams per minute, and the screw rotation speed may be from 15 to 300 r.p.m. It is preferable that the barrel temperature be from −5° to 200° C. If the barrel temperature is below 5° C., the raw material is in a frozen state and therefore a desired product cannot be obtained. If the barrel temperature is above 200° C., a burning smell may occur and therefore such a temperature is undesirable. When the vegetable proteins such as soybean protein flour are used, the barrel temperature of about 150° C. (±10° C.) is suitable from the standpoint of its texturization. The resulting final product may become a meat-like food product having a higher fiber mouthfeel than the prior art product. Alternatively, the resulting final product may become a snack-like food product. Thus, there is obtained a new food product of quite different quality, mouthfeel and other features from those of the raw materials. When the product is minutely examined by means of an electron microscope, it does not have the original form and the modification of the texture and structure is confirmed.

In another feature of the present invention, when a twin-screw extruder having a flat, circular or double cylindrical induction nozzle provided integrally with the die of the twin-screw extruder described above or provided removably at the tip of the die is used as the twin-screw extruder in the present invention, it is possible to obtain a product textured in a form conforming to the shape of the nozzle. The flat induction nozzle may be in any form. In an example, the connection portion of the discharge port is cylindrical and extends in the form of a sector while reducing its thickness, and its tip has a slit by which the texture is induced into the form of a thin plate. The thickness of the slit is from about 1 to about 20 mm and the width of the slit is from about 1 to about 600 mm. A slit having a suitable thickness and a suitable width can be selected. The number of the slits may be from one or two up to about 10. Moreover, the circular induction nozzle is in the form of a hollow rod of an inner diameter of from about 0.5 to 50 mm, and a length of from 100 to 800 mm. When a circular induction nozzle having a small inner diameter of no more than 10 mm is used, for example, 2 to 20 nozzles may be provided rather than one nozzle so that multiple rod-shaped products are discharged.

In the case of a double cylindrical induction nozzle, the connection portion of the discharge port is cylindrical and extends in the form of a cone while reducing its thickness, and its tip is in the form of a cylinder. The thickness of a slit constituted by the double cylinders may be from about 1 to about 20 mm, and the length of the cylinders may be from about 100 to about 800 mm.

When the material is treated by means of the twin-screw extruder equipped with a die shape having a flat, circular or double cylindrical induction nozzle in the present invention, such a treatment is generally carried out under the conditions as described above. When the temperature of the inner portion of the extruder is varied depending on position and the treatment is carried out under the following conditions, a textured food product having good qualities can be obtained. That is, the material is first heated and melted at the axial tip of the twin-screw extruder; the texturization of the melt is carried out by raising the temperature at the first half of the induction nozzle or leaving it as it is; the treated material is cooled at the latter half of the induction nozzle to lower the temperature of the textured product to 100° C. or below; and the textured product is taken out from the induction nozzle.

Specifically, when the material is heated to a temperature of from 110° to 160° C. at the axial tip portion of the twin-screw extruder by means of electric heat or the like, the original texture is removed by this twin-screw extruder treatment and the material is in a completely molten state.

A new texture can be then formed by heating the thus molten treated material to raise its temperature while introducing it into the induction nozzle, or by leaving it as it is. The heating is carried out by heating to a temperature of from 130° to 250° C. at the first half of the induction nozzle by electric heating or the like to raise the product temperature.

The treated material textured by introduction into the induction nozzle where the product temperature is elevated, is then cooled with cold water at the latter half of the induction nozzle to lower the temperature of the textured treated material to 100° C. or below (at which temperature, the boiling of water is prevented). The textured treated material is taken out from the induction nozzle. Thus, a textured product having very good qualities which is molded in a form conforming to the shape of the die can be obtained.

In another feature of the present invention, when surimi paste or a mixture of surimi paste and the mixing additive is treated under the following specific temperature/pressure conditions by means of the twin-screw extruder, a good meat-like textured product can be obtained. In this case, the material is first treated at a low temperature under pressure, and the resulting gel or sol semi-product is subjected to post-heating to coagulate the same. While the extruder treatment conditions can vary depending upon the kind of the raw materials to be treated, such conditions may be selected from the following range: a temperature of from −5° to 70° C., preferably from 5° to 50° C., and a pressure of from 0.1 kg/cm$^2$ to 150 kg/cm$^2$, preferably from 5 to 100 kg/cm$^2$ (the pressure being that when the treated material is discharged from the extruder). If the temperature is above 70° C., the surimi paste will undergo thermal denaturation to form other textured products. If the temperature is below −5° C., the raw material is in a frozen state and therefore a desired product cannot be obtained. If the pressure is more than 150 kg/cm$^2$, the discharge of the raw material from the die will become vigorous, and the discharged treated material will exhibit a form similar to that obtained by drying by means of a spray dryer. If the pressure is less than 0.1 kg/cm$^2$, the moldability of the raw material will be reduced, and therefore a desired product cannot be obtained in this case.

It is preferable that such a treatment be carried out at a raw material-feeding rate of from 50 to 3,000 grams per minute and at a barrel temperature of from 10° to 70° C.

While the screw rotation speed can vary depending upon the kind of the raw materials, it is suitable that the rotation speed be from 15 to 200 r.p.m., preferably from 15 to 150 r.p.m. The pressure conditions can be set by setting the rotation speed.

A semi-product having uniform qualities is continuously obtained from the outlet of the extruder by treating the raw material by means of the extruder, as described above. The semi-product thus obtained is in a sol or gel state.

Then, the thus obtained semi-product can be immediately heated to undergo thermal coagulation. Alternatively, after coloring and remolding, the semi-product can be heated to undergo thermal coagulation. Thus, a textured fish and shellfish product having a desired meat-like mouthfeel is obtained as one of preferable embodiments of the present invention.

Conventional heating apparatuses using vapors, electricity, gases, oil frying or the like can be used as a heating apparatus for heating the semi-product described above. Either a batch process or a continuous process may be used provided that the thermal coagulation and pasteurization of said product can be carried out.

Any heating temperature and any heating time can be used provided that such temperature and time are those sufficient to cause thermal coagulation of the semi-product. Ordinarily, the semi-product is heated for 1 to 30 minutes at a temperature of from 80° to 200° C.

Thus, according to the present invention, by treating the material comprising one or more raw materials of marine products selected from the group consisting of fishes, shellfishes, e.g. Crustacea and mollusks, and seaweeds, or a mixture of the raw material and the mixing additive by means of the twin-screw extruder, there can be provided a food product wherein the raw material is textured to utilize the properties of the raw material, wherein water-soluble protein and/or salt-soluble protein are retained, wherein its quality and mouthfeel are different from those of the raw material while retaining raw material-derived taste and flavor, and wherein the food product has new texture and structure. This food product does not have the appearance and odor of fishes and shellfishes and seaweeds. While the food product can be enjoyably eaten as a low fat protein as it is, the food product can be also used as a raw material for hamburg steaks, hams or the like.

Further, in the process, the raw material can be processed and treated for a short period of time by means of one apparatus having multiple functions without using exclusive machines each having a single function in each step. Thus, the present invention is economical and efficient. Furthermore, marine materials such as fishes and shellfishes and seaweeds can be effectively utilized and new use of the twin-screw extruder can be developed. Thus, the present invention is very effective.

The following non-limiting examples illustrate the present invention.

EXAMPLE 1

Mackerels were treated by means of a fillet machine to remove the head, guts and backbone to form fillet, and the fillet was treated by means of a fish deboner to remove the small bones and skin to obtain chopped fish meat.

This chopped fish meat was treated under the following conditions by means of a twin-screw extruder (a-Raiser-100 Type manufactured by Suehiro Iron Works Co., LLtd., Japan). That is, the feed speed of the chopped fish meat to the extruder was maintained at 800 grams per minute, the screw rotation speed was maintained at 120 r.p.m., and the barrel temperature was maintained at 150° C.

The examination with the naked eye showed that the resulting product was textured. When the fine structure of the product was minutely examined by means of a transmission-type electron microscope, it was confirmed that the original form of the fish flesh was absent and that the texture and structure were completely modified.

Further, this product had a mouthfeel having biting properties similar to those of meat.

EXAMPLE 2

An appropriate amount of edible red dye was added to a mixture of 50 parts of defatted soybean flour and 100 parts of a material obtained by removing the head and guts of sardines and thereafter grinding them. The resulting mixture was treated by means of an extruder under the same conditions as described in Example 1. The resulting product had an appearance very similar to that of meat. Examinations with the naked eye and transmission-type electron microscope confirmed that the product was completely textured. Its mouthfeel was similar to that of meat and was excellent.

EXAMPLE 3

Marine product-based formulations as shown in Table 1 were treated with an extruder under the same conditions as described in Example 1. It was confirmed that the resulting products were textured while they had marine raw material-derived specific taste and flavor.

TABLE 1

| | Formulation | | | |
|---|---|---|---|---|
| | 1 | 2 | 3 | 4 |
| Chopped squid flesh | 100 | 100 | — | — |
| Shucked short-necked clam | — | — | 100 | — |
| Raw Undaria pinnatifida | — | — | — | 100 |
| Wheat flour | 30 | — | 50 | 10 |
| Soybean protein flour | 30 | — | 30 | 20 |
| Wheat gluten flour | — | 50 | — | 20 |
| Seasoning | 3 | 3 | 3 | 3 |

EXAMPLE 4

Frozen surimi obtained by using commercially available Alaska pollacks as raw materials was treated by means of a twin-screw extruder (manufactured by Kowa Kougyo Co., Ltd.) under the following conditions.

The feed rate of the surimi to the feeder was maintained at 400 grams per minute; the twin-screws were controlled so that a screw rotation speed within 250 r.p.m. was maintained; and the barrel temperature was maintained at 150° C. during the treatment period.

Examination with the naked eye showed that the resulting product was completely textured. Further, when its texture and structure were minutely examined by means of a scanning electron microscope, it was confirmed that the original form of the surimi was absent and that the product was completely textured.

When this product was eaten, it was confirmed that the product had excellent elasticity and excellent mouthfeel and flavor comparable to those of meat, and that the product was excellent not only in physical characteristics and forms but also in sensory properties.

EXAMPLE 5

Frozen surimi was treated with a twin-screw extruder having a flat induction nozzle (slit of 2×100 mm) at the tip of the die (manufactured by Kowa Kougyo Co., Ltd., Japan), under the following conditions.

The feed speed of the surimi paste to the feeder was maintained at 300 grams per minute; the twin screws were controlled so that the screw rotation speed was maintained within 200 r.p.m.; and the barrel temperature was maintained at 150° C. during the treatment period. The resulting product was in the form of substantially a 2×100 mm ribbon. Examination with the naked eye confirmed that the texturization was complete. Further, when its fine structure was minutely examined by means of a scanning electron microscope, it was confirmed that the original form of the surimi was absent, and that the product was completely textured.

Further, this product was cut into pieces each having a length of 10 cm. A binding agent was added to laminate 5 pieces. The laminated pieces were slightly pressed into the form of a steak and thereafter fried in a frying pan. When the fried product was eaten, it was confirmed that excellent elasticity and excellent mouthfeel and flavor comparable to those of meat were produced, and that the product was excellent not only in physical characteristics and form, but also in sensory properties.

EXAMPLE 6

A mixture of 50% of frozen surimi, 25% of marine beef and 25% of whole soybean was used as a raw material. The mixture was treated by means of a twin-screw extruder having a flat induction nozzle (slit of 6×50 mm) at the tip of the die, under the following conditions.

Feed rate of the raw material: 300 grams per minute; screw rotation speed: 200 r.p.m.; and barrel temperature: 150° C.

The resulting product was a meat-like product in the form substantially of a 6×50 mm ribbon, and was favorably textured.

EXAMPLE 7

Frozen surimi was treated with a twin-screw extruder having a flat induction nozzle (having a slit of 2×100 mm, a heating portion and a cooling portion) at the tip of the die (manufactured by Kowa Kougyo Co., Ltd., Japan), under the following conditions.

The feed rate of the surimi to the feeder was maintained at 300 grams per minute; the twin screws were controlled so that the rotation speed was maintained within 200 r.p.m.; and the temperature of the end of the barrel was maintained at 140° C., the temperature of the first half of the induction nozzle at 180° C., cold water being passed through the latter half of the induction nozzle during the treatment period.

The resulting product was in the form substantially of a 2×100 mm ribbon. Examination with the naked eye confirmed that the texturization was complete. Further, when its fine structure was minutely examined by means of a scanning electron microscope, it was confirmed that the original form of the surimi was absent, and that the product was completely textured.

Further, this product was cut into pieces having a length of 10 cm. A binding agent was added to laminate 5 pieces. The laminated pieces were slightly pressed into the form of a steak and thereafter fried in a frying pan. When the fried product was eaten, it was confirmed that excellent elasticity and excellent mouthfeel and flavor comparable to those of meat were produced, and that the product was excellent not only in physical characteristics and form, but also in sensory properties.

EXAMPLE 8

A mixture of 50% of frozen surimi, 25% of marine beef and 25% of whole soybean was used as a raw material, and treated by means of a twin-screw extruder under the same conditions as described in Example 7.

The resulting product was a meat-like product in the form substantially of a 6×50 mm ribbon, and was favorably textured.

EXAMPLE 9

A raw material paste obtained by adding 2 kg of salt, 10 kg of potato starch and 3 kg of seasoning to 100 kg of frozen surimi processed on board and kneading them, was treated by means of a twin-screw extruder (rotation speed: 25 r.p.m.; and barrel temperature: 5° C.) to obtain a semi-product having a width of 50 mm, a thickness of 3 mm and a length of 100 mm. At this point, the pressure at the outlet of the extruder was recorded as 6 kg/cm$^2$. The resulting semi-product described above was then heated for 5 minutes at a temperature of 95° C. by vapor heating and thus coagulated. The extrudates had a mouthfeel similar to that of a squid and was a product which was difficult to obtain in the prior art.

EXAMPLE 10

Example 9 was repeated except that the amount of potato starch added was 30 kg. The resulting product was textured and had an excellent mouthfeel.

EXAMPLE 11

A raw starting paste obtained by adding 5 kg of salt, 40 kg of corn starch and 5 kg of seasoning to 100 kg of minced sardines and 100 kg of frozen surimi and kneading the mixture, was fed to the hopper of a twinscrew extruder in a constant rate and treated at a screw rotation speed of 35 r.p.m. and at a barrel temperature of 0° C. to obtain a semi-product having a width of 50 mm, a thickness of 2 mm and a length of 100 mm. At this point, the pressure at the outlet of the extruder was recorded as 5 kg/cm$^2$. The resulting semi-product was then heated for 10 minutes at a temperature of 90° C. by vapor heating and thus coagulated. The extrudate was a hamburg steak-like food product having a mouthfeel similar to that of meat.

What is claimed is:

1. A process for processing and treating a marine product, which comprises:

providing a raw material having a moisture content of about 50 to 80% comprising at least one marine product selected from the group consisting of fish meat, surimi, crustacean meat, mollusks meat and shell fish meat, said raw material containing up to 100% by weight of a mixing additive based on the weight of the marine product; and kneading, heating and molding said raw material by means of a twin-screw extruder having a die equipped with an induction nozzle to obtain a textured product, wherein the material is treated by means of the twin-screw extruder at a barrel temperature of from −5° C. to 200° C., and wherein the material is in a molten state at the axial tip portion of the twin-screw extruder; texturization of said material is carried out by maintaining or raising the temperature at the first half of the induction nozzle; said material is cooled at the latter half of the induction nozzle to lower the temperature of the textured product to 100° C. or below; and the textured product is taken out from the induction nozzle.

2. The process according to claim 1 wherein the twin-screw extruder has a die equipped with an induction nozzle of a flat, circular or double cylindrical shape.

3. The process according to claim 1 wherein the raw material comprises surimi or a mixture of surimi and the mixing additive, and is treated by means of the twin-screw extruder at a screw rotation speed of 15 to 300 r.p.m.

4. The process according to claim 1 wherein the raw material comprises surimi or a mixture of surimi and the mixing additive, and is treated by means of the twin-screw extruder at a barrel temperature of from −5° C. to 70° C. under a pressure of from 0.1 to 150 kg/cm$^2$, and then subjected to thermal coagulation.

5. The process according to claim 1 wherein the mixing additive is at least one member selected from the group consisting of soybean origin vegetable proteins, wheat origin vegetable proteins, yeasts, starch, cereal flours, milk, dry milk powder, casein, chopped meat, egg albumin, vegetables and fruits.

6. The process according to claim 1 wherein the mixing additives is at least one member selected from the group consisting of whole soybean, defatted soybean, defatted soybean flour, soybean protein flour, wheat gluten, bean-curd refuse, adzuki beans, peanuts, yeasts, potato starch, corn starch, wheat flour, rice flour, milk, dry milk powder, casein, chopped meat, egg albumin, vegetables and fruits.

* * * * *

UNITED STATES PATENT AND TRADEMARK OFFICE
CERTIFICATE OF CORRECTION

PATENT NO. : 4,816,278
DATED : March 28, 1989
INVENTOR(S) : Yasuhiko SASAMOTO et al.

It is certified that error appears in the above-identified patent and that said Letters Patent is hereby corrected as shown below:

On the title page,
in item "[73] Assignees:" in the heading of the Patent, delete "The Japanese Research and Development Association for Extrusion Cooking;".

Signed and Sealed this

Sixth Day of February, 1990

Attest:

JEFFREY M. SAMUELS

Attesting Officer     Acting Commissioner of Patents and Trademarks